US006791463B2

(12) United States Patent
Iwasaki et al.

(10) Patent No.: US 6,791,463 B2
(45) Date of Patent: Sep. 14, 2004

(54) ON-BOARD CONTROL SYSTEM AND METHOD FOR VEHICLES

(75) Inventors: Tatsuya Iwasaki, Nukata-gun (JP); Nobutomo Takagi, Okazaki (JP); Hiroshi Kikukawa, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/151,235

(22) Filed: May 21, 2002

(65) Prior Publication Data

US 2002/0177931 A1 Nov. 28, 2002

(30) Foreign Application Priority Data

May 24, 2001 (JP) ....................................... 2001-155605

(51) Int. Cl.[7] ................................................ G08B 21/00

(52) U.S. Cl. .................... 340/636.1; 340/635; 340/660; 340/663

(58) Field of Search ............................. 340/636.1, 635, 340/425.5, 660, 663

(56) References Cited

U.S. PATENT DOCUMENTS 5,045,835 A * 9/1991 Masegi et al. .............. 340/438
5,227,981 A * 7/1993 Katsuki et al. ............. 364/483
5,506,775 A * 4/1996 Tsurushima et al. ... 364/424.05
5,859,583 A * 1/1999 Mayumi et al. ............ 340/436
6,257,363 B1 * 7/2001 Midorikawa et al. ....... 180/268
2002/0075166 A1 * 6/2002 Yoshioka .................... 340/901

FOREIGN PATENT DOCUMENTS

JP A-6-82265 3/1994
JP A-8-188113 7/1996

* cited by examiner

*Primary Examiner*—Julie Lieu
(74) *Attorney, Agent, or Firm*—Posz & Bethards, PLC

(57) ABSTRACT

In an on-board control system, a body ECU executes various control operations in response to the supply of power voltage from a battery. There is connected on the power line of the battery a voltage holding circuit which is formed of a capacitor so that the variation of battery voltage slows. A switch input circuit samples the on/off states of external switches periodically under control of a microcomputer. The microcomputer determines a fall of battery voltage, causing the switch input circuit to stop sampling of switch states. Stopping the circuit operation and thus reducing the battery load current slows the voltage fall at the occurrence of collision of vehicle, allowing adequate time to store collision data in a collision memory circuit.

8 Claims, 4 Drawing Sheets

10 11 12 13
VCC
POWER
MICRO-COMPUTER
OUTPUT CONTROL 14
OUTPUT CONTROL 14
OUTPUT CONTROL 14
21 VB
16 SAMPLE
22
15 SWITCH INPUT
23 COLLISION
SENSOR INPUT 17
MEMORY 18

OUTPUT CONTROL
MICRO-COMPUTER
MEMORY
POWER
VCC
SAMPLE
SWITCH INPUT
SENSOR INPUT
COLLISION
VB

ON-BOARD CONTROL SYSTEM AND METHOD FOR VEHICLES

CROSS REFERENCE TO RELATED APPLICATION

This application is based on and incorporates herein by reference Japanese Patent Application No. 2001-155605 filed May 24, 2001.

FIELD OF THE INVENTION

The present invention relates to an on-board control system and method, which ensures control operation in a vehicle.

BACKGROUND OF THE INVENTION

It is proposed to design a control system equipped on a vehicle to memorize data of the event of collision of the vehicle in a collision memory circuit and unlock the doors of the vehicle in accordance with the collision data in the collision memory circuit. Even if the power voltage falls (or fails) temporarily due to the impact of collision, this control system is capable of unlocking the doors promptly immediately after the power voltage recovers based on the collision data stored at the occurrence of collision.

The on-board control system has a voltage holding capacitor connected to the power line so that the fall of line voltage slows at the momentary power failure, allowing the collision data storing operation. In order to have a voltage hold time that is long enough to store the collision data in the memory circuit, the voltage holding capacitor must have a large capacitance, which adds costs.

Temporary power voltage fall or power failure may be caused by the vibration of the vehicle, cranking of the engine, and breakage of the power line. Control operations will be suspended in these cases.

SUMMARY OF THE INVENTION

The present invention has an object to provide an on-board control system and method which is designed, without the need of cost increase, to operate stably at a temporary fall of power voltage.

An on-board control system according to the present invention determines a fall, or drop of power voltage which is caused by the collision of a vehicle, vibration of the vehicle, or cranking of a vehicle engine. The control system then stops one of several control operations selectively at the fall of power voltage, so that the control system has its load current reduced, thereby slowing the voltage fall. Accordingly, the control system can slow the voltage fall without requiring a voltage holding capacitor with a large capacitance connected to the power line. The control system can perform the critical operations before the power voltage falls to the voltage level at which the microcomputer, etc. is reset. Therefore, the control system can operate stably at a fall of power voltage without the need of cost increase for a large capacitor. The control system has the enhanced reliability against the momentary power failure of the vehicle.

BRIEF DESCRIPTION OF THE DRAWINGS

The above and other objects, features and advantages of the present invention will become more apparent from the following description made with reference to the accompanying drawings. In the drawings.

DETAILED DESCRIPTION OF THE PREFERRED EMBODIMENT

Figure 1:
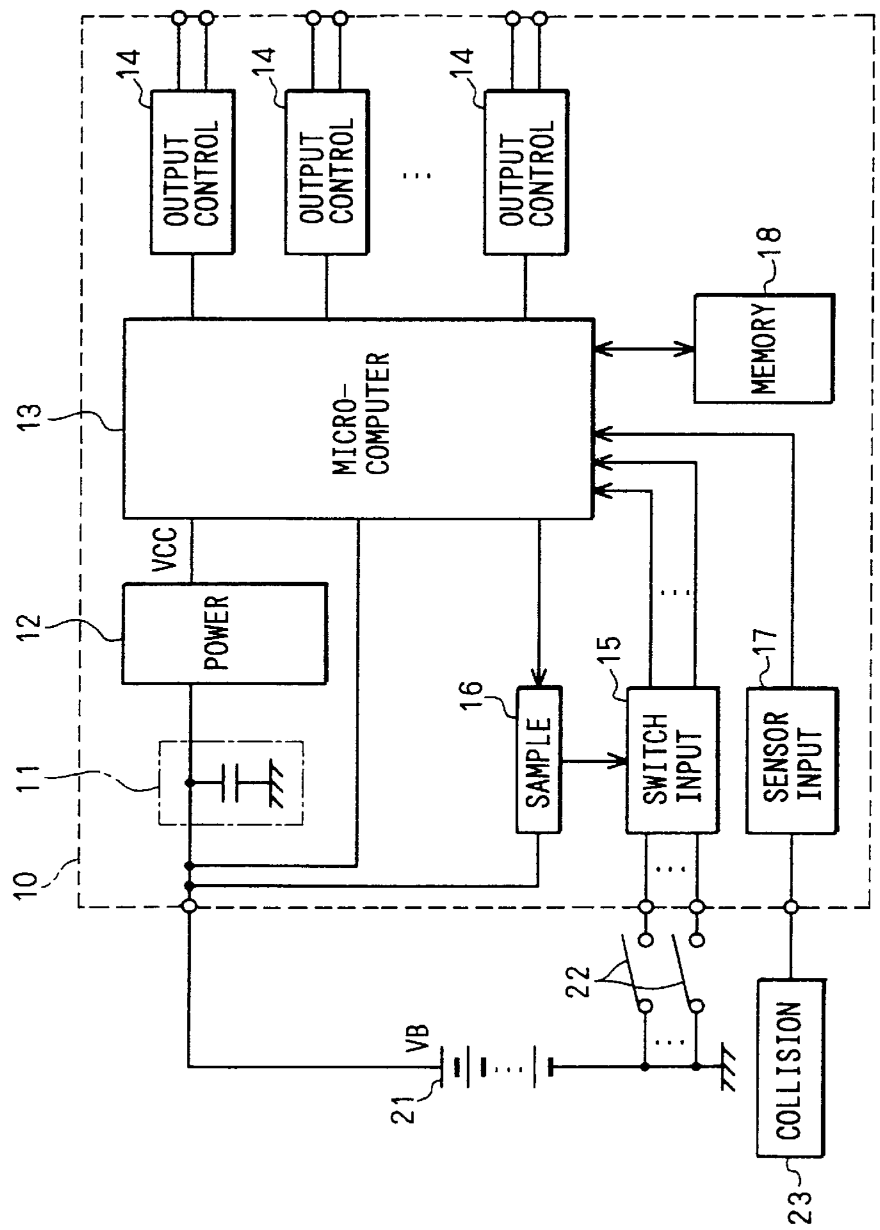
FIG. 1 is a block diagram showing an on-board control system according to an embodiment of this invention.

Referring to FIG. 1, an on-board control system has a body ECU 10, which is an electronic control unit for controlling vehicle body systems such as centralized door lock control, room light control, and remote door key control. The body ECU 10 is supplied with a power voltage from a battery 21 of the vehicle. The voltage VB of the battery 21, which is nominally 12 volts for example, is fed via a voltage holding circuit 11 formed of a capacitor to a power circuit 12 in the body ECU 10. The power circuit 12 produces from the battery voltage VB a constant voltage Vcc to be supplied to a microcomputer 13. The microcomputer 13 is a known logical computation circuit made up of a CPU, various memories, etc. It executes various computations for the centralized door lock control, room light control, etc. and delivers control signals to several output control circuits 14 which control various associated actuators (not shown). The microcomputer 13 also monitors the battery voltage VB uninterruptedly.

This on-board control system includes several external switches 22 for detecting the states of the vehicle. The microcomputer 13 fetches the on/off states of the switches 22 via a switch input circuit 15. The external switches 22 include switches which turn on or off in response to the opening or closing of doors, and switches which are turned on or off by the vehicle driver.

The switch input circuit 15 samples the states of external switches 22 periodically under control of the microcomputer 13. Specifically, the microcomputer 13 releases an on-signal at a certain interval (e.g., several tens milliseconds) to a sampling circuit 16, which responds to the on-signal to turn on a switching element (transistor) in the circuit 16. Consequently, the switch input circuit 15 receives the voltage of the battery 21 via the sampling circuit 16, causing the on/off states of external switches 22 to be put into the microcomputer 13. The switch input circuit 15 and sampling circuit 16 function as an input processing circuit.

This control system further includes a collision sensor 23 which is formed of an acceleration sensor (G sensor) known in the art. The microcomputer 13 fetches the output of the collision sensor 23 via a sensor input circuit 17.

A collision memory circuit 18 is formed of a capacitor, which is charged at the occurrence of collision of vehicle so that the event of collision is memorized in terms of a capacitor voltage. The collision memory circuit 18 is charged and discharged under control of the microcomputer 13. The microcomputer 13 monitors the capacitor voltage of the collision memory circuit 18 uninterruptedly.

Figure 2:
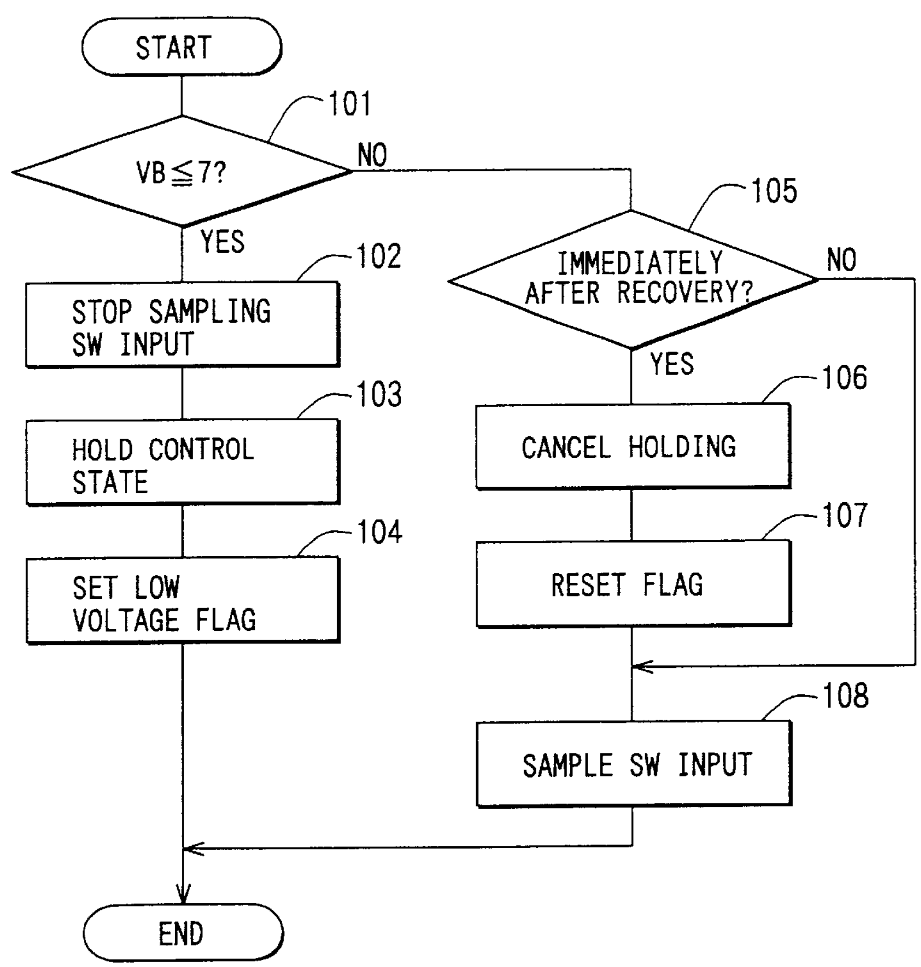
FIG. 2 is a flowchart showing a power voltage monitoring process executed in the embodiment.

Next, the operation of the on-board control system arranged as above will be explained. FIG. 2 shows by flowchart the power voltage monitoring process for the battery 21. This process is executed by the microcomputer 13 at a certain interval (e.g., 1 ms).

In FIG. 2, the first step 101 determines whether the battery voltage VB falls below a certain threshold voltage (e.g., 7 volts). On detecting the lower battery voltage VB, the sequence proceeds to step 102, in which the switch input circuit 15 stops sampling of the external switches 22. Specifically, the microcomputer 13 suspends the release of the on-signal to the sampling circuit 16 thereby to cut off the voltage of the battery 21 to the switch input circuit 15. In consequence, all output signals from the switch input circuit 15 to the microcomputer 13 are fixed to the off (low) state.

Following the stop of sampling of the states of external switches 22, the next step 103 holds the present output states of the output control circuits 14. Step 104 sets the flag of low battery voltage to "1", and terminates the process.

In case the step 101 makes a negative determination, the sequence proceeds to step 105 to determine whether it is immediately after the recovery of battery voltage VB above the threshold voltage based on the value of the battery low-voltage flag which has been set when the battery voltage VB has fallen temporarily.

If the step 105 makes a positive determination, the sequence proceeds to step 106 to cancel the output holding of the output control circuits 14, and the next step 107 resets the battery low-voltage flag to "0". The next step 108 executes the sampling of the external switches 22 by the switch input circuit 15.

During the operation at the normal battery voltage VB, the steps 101 and 105 make negative determinations, causing only the step 108 to take place repeatedly. The step 101 thus performs determination function, and step 102 performs holding operation.

Figure 3:
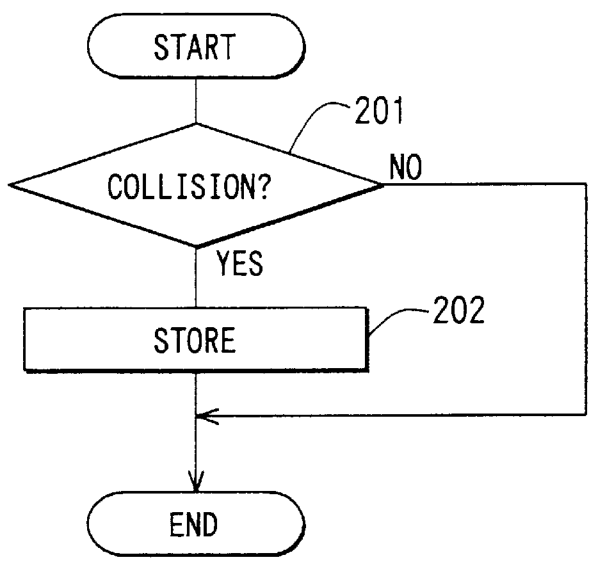
FIG. 3 is a flowchart showing a collision detecting process executed in the embodiment.

FIG. 3 shows by flowchart the collision detecting process. This process is executed by the microcomputer 13 at a certain interval (e.g., 1 ms). The first step 210 determines the occurrence of collision based on the output of the collision sensor 23. If the collision is detected, the sequence proceeds to step 202, or otherwise the process terminates. The step 202 stores the event of collision in the collision memory circuit 18. Specifically, charging to the capacitor of the collision memory circuit 18 begins.

Figure 4:
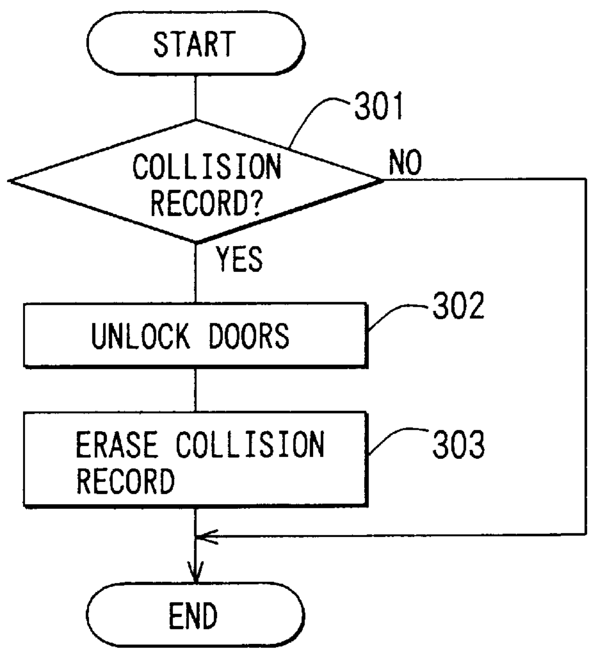
FIG. 4 is a flowchart showing a door unlocking process executed in the embodiment.

FIG. 4 shows by flowchart the door unlocking process. This process is included in the initializing process after the microcomputer 13 has been reset for example. The first step 301 monitors the capacitor voltage of the collision memory circuit 18 to detect the occurrence of collision. If the capacitor voltage is above the threshold voltage of collision indicative of the occurrence of collision, the sequence proceeds to step 302 to unlock all doors. The next step 303 erases the record of collision by discharging the capacitor in the collision memory circuit 18.

Figure 5:
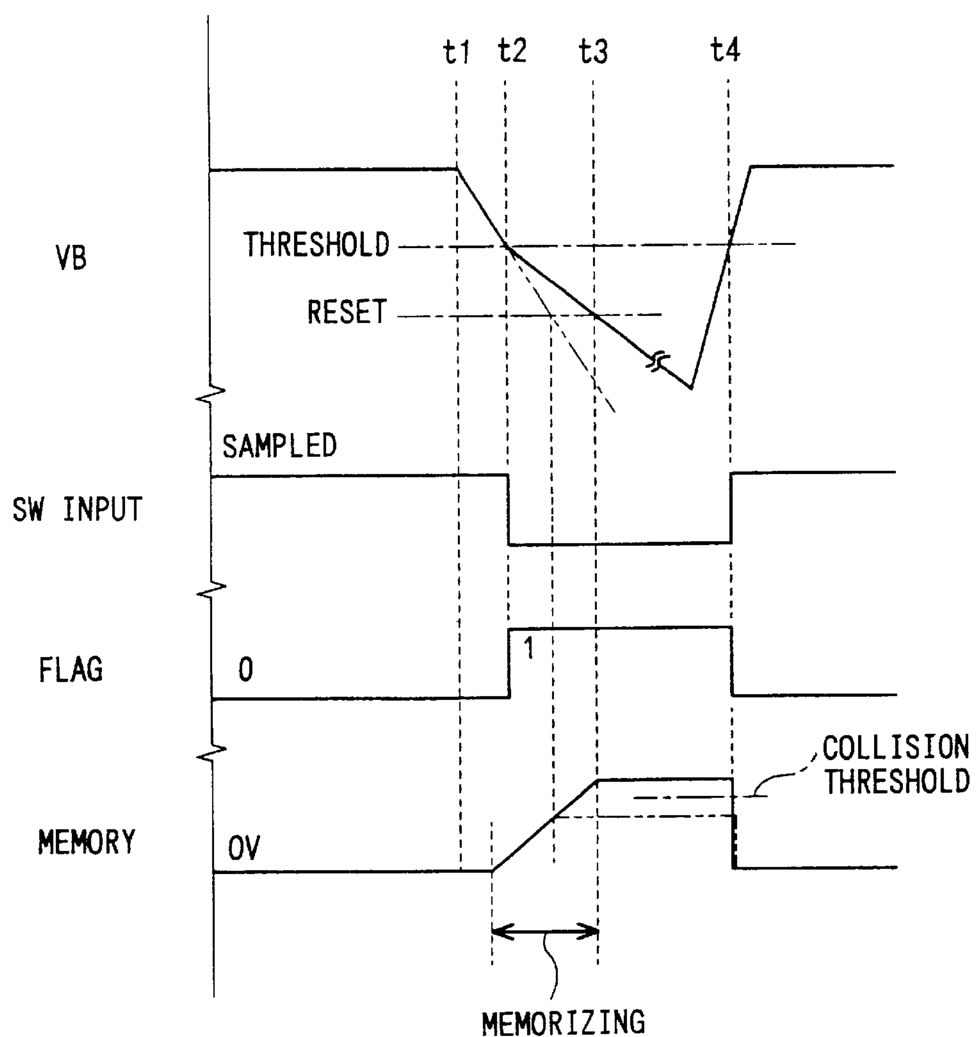
FIG. 5 is a timing diagram showing the operation of the embodiment at the occurrence of collision of vehicle.

FIG. 5 shows by timing diagram the operation of the on-board control system when the battery voltage VB falls due to the occurrence of collision.

Before time point t1, at which the collision occurs, the battery voltage VB is normal. The battery voltage VB begins to fall at the time point t1 due to the temporary loosening of power line connection or the like. Immediately after the time point t1, the battery voltage VB falls along a slope that depends on the capacitance of the capacitor in the voltage holding circuit 11.

The battery voltage VB reaches a threshold voltage (e.g., 7 volts) at time point t2, causing the switch input circuit 15 to stop the sampling of the states of external switches 22 and the battery low-voltage flag to be set to "1". The battery 21 has its load current reduced owing to the stop of switch state sampling after the time point t2, and the fall of battery voltage VB slows.

Immediately after the occurrence of collision, the collision memorizing process for the collision memory circuit 18 begins based on the output of the collision sensor 23. There is adequate time for this process (capacitor charging time) owing to the reduced load current of the battery 21. The collision memorizing process, i.e., charging of the capacitor in the collision memory circuit 18, takes place during the period after the microcomputer 13 detects the collision until it is rest.

During the period when the battery voltage VB falls, the pull-up voltage of the external switches 22 also falls, causing the switch states to be indeterminate. However, erroneous reading of external switches 22 can be prevented based on the stopping of switch state sampling by the switch input circuit 15.

The battery voltage VB begins to rise, and when it reaches the threshold voltage (e.g., 7 volts) at time point t4, the stop of switch state sampling by the switch input circuit 15 is lifted and the battery low-voltage flag is reset to "0". The switch input circuit 15 resumes the sampling of the states of external switches 22, and the normal control operation is restored.

Immediately after the power voltage has recovered, the record of collision is checked in terms of the capacitor voltage of the collision memory circuit 18, and the door unlocking operation takes place if the capacitor voltage exceeds the threshold voltage of collision.

Whereas, in case the stopping of switch state sampling by the switch input circuit 15 is not executed, the battery voltage VB will fall more rapidly as shown by the dash-dot line in FIG. 5, causing the microcomputer 13 to be reset (the timing the voltage falls to the voltage level at which the microcomputer is reset) prematurely, with the capacitor voltage of the collision memory circuit 18 being left still low (shown by the dash-dot line). Therefore, the correct determination of the occurrence of collision can possibly fail after the battery voltage recovers.

This embodiment provides the following advantage.

At a fall of battery voltage VB caused by the collision of vehicle, the event of collision is memorized on a priority basis. Other operations are suspended so that a time that is long enough to memorize the event of collision is available. In other words, when the battery voltage drops due to a vehicle collision, other vehicle operations are suspended so that the battery voltage can be used primarily to store voltage in the capacitor in the collision memory circuit 18 to thereby record the occurrence of the collision. In this manner, the occurrence, or event, of a collision can be determined accurately to properly enable post-event operations such as unlocking the doors to be properly performed.

The fall of battery voltage VB can be slowed without the need of a large capacitance of the capacitor in the voltage holding circuit 11, whereby a cost increase of the on-board control system can be avoided. The battery 21 is relieved of a momentary voltage fall, whereby the body ECU 10 can be made more compact and lower in cost.

At a fall of battery voltage VB, the switch input circuit 15 stops sampling of switch states, with other actuator control outputs being kept unchanged, whereby erroneous reading of external switches 22 and resulting improper operations of the microcomputer 13 can be prevented.

Also at a fall of battery voltage VB caused by the vibration of vehicle or cranking of engine, the switch input circuit 15 stops sampling of switch states, with actuator control outputs being kept unchanged, and critical operations can be performed before the microcomputer 13 is reset due to power shortage. Whereby, the operation of body ECU 10 is ensured.

Even in case the battery voltage VB falls during the writing of various control data into a nonvolatile memory such as EEPROM, the foregoing operation shown in FIG. 2 can slow the fall of battery voltage VB, thereby preventing the interruption of data writing. That is, by slowing the fall of battery voltage VB, adequate time for writing the data into the EEPROM is available to finish the writing of the data.

The above embodiment may be varied as follows. Instead of stopping the sampling of switch states by the switch input circuit 15 at a fall of battery voltage VB in the foregoing embodiment, other control operations, e.g., room light control, are stopped in addition to or in place of switch state sampling thereby to reduce the battery load current. In any case, stopping one of control operations performed by the body ECU 10 reduces the power consumption of the body ECU 10, and then reduces the drop of the battery voltage VB. In this manner, the control system can operate stably even during a drop in the battery voltage VB without increasing the cost as described above.

Although the doors of vehicle are unlocked based on the collision data stored in the collision memory circuit 18 in the foregoing embodiment, the data can also be used for other purposes obviously. This is accomplished by the accurate determination of the occurrence of collision based on an adequate time for memorizing the event of collision.

Although the functions of voltage drop determination and operation stopping are performed by the microcomputer 13 on a software basis in the foregoing embodiment, it is possible to carry out at least one of the functions on a hardware basis.

Although the on-board control system is arranged with the body ECU, it may be arranged with other ECU of vehicle such as the engine ECU or transmission ECU.

What is claimed is:

1. An on-board control system that performs a plurality of control operations in response to a supply of a power voltage from an on-board power source, the on-board control system having a voltage holding capacitor for slowing a variation of the power voltage, the control system comprising:

determination means that determines a fall of power voltage;

operation stopping means for stopping any of the control operations selectively at the fall of power voltage;

a plurality of switches that are pulled up to the voltage of the on-board power source; and an input processing circuit that detects the states of the plurality of switches periodically, wherein the operation stopping means stops operation of the input processing circuit at the fall of the power voltage.

2. An on-board control system according to claim 1, wherein control outputs to other actuators are kept unchanged when the operation stopping means stops the operation of the input processing circuit.

3. An on-board control system that performs a plurality of control operations in response to a supply of a power voltage from an on-board power source, the on-board control system having a voltage holding capacitor for slowing a variation of the power voltage, the control system comprising:

determination means that determines a fall of power voltage;

operation stopping means for stopping any of the control operations selectively at the fall of power voltage; and a collision memory circuit that memorizes an event of collision at an occurrence of a collision at the fall of the power voltage caused by the collision and the stopping of the any of the control operations.

4. An on-board control system according to claim 3, wherein the collision memory circuit includes a capacitor that is charged at the occurrence of the collision, and the occurrence of the collision is determined based on a charge of the capacitor.

5. An on-board control method for a vehicle having a battery, a power holding circuit for holding a battery voltage, a collision sensor and a collision memory, the control method comprising steps of:

monitoring the battery voltage;

stopping a part of a vehicle control performed with the battery voltage when the monitored voltage falls below a predetermined threshold, so that rate of fall of the battery voltage is slowed; and storing a collision detected by the collision sensor in the collision memory with the battery voltage of the power holding circuit.

6. An on-board control method according to claim 5, wherein the storing step charges a capacitor when the collision is detected.

7. An on-board control method according to claim 5, further comprising steps of:

checking a record of collision stored in the collision memory; and unlocking doors when the record of collision is detected.

8. An on-board control method according to claim 5, wherein the stopping step stops sampling of conditions of input switches as the part of the vehicle control and holds control conditions of the vehicle unchanged.

* * * * *